April 14, 1964

A. STRATIENKO 3,129,010

SHAFT SEAL ASSEMBLY

Filed June 2, 1960

INVENTOR.
Andrew Stratienko,
BY Paul & Paul
ATTORNEYS.

April 14, 1964

A. STRATIENKO 3,129,010

SHAFT SEAL ASSEMBLY

Filed June 2, 1960

INVENTOR.
*Andrew Stratienko,*
BY *Paul & Paul*
ATTORNEYS.

April 14, 1964

A. STRATIENKO 3,129,010

SHAFT SEAL ASSEMBLY

Filed June 2, 1960

INVENTOR.
Andrew Stratienko,
BY
Paul & Paul
ATTORNEYS.

United States Patent Office 3,129,010
Patented Apr. 14, 1964

3,129,010
SHAFT SEAL ASSEMBLY
Andrew Stratienko, Philadelphia, Pa., assignor to Philadelphia Gear Corporation, King of Prussia, Pa.
Filed June 2, 1960, Ser. No. 33,455
4 Claims. (Cl. 277—9)

This invention relates to a shaft seal assembly for liquid agitating devices. More specifically, it is concerned with a seal assembly adapted to be associated with a drive shaft entering through an opening in the side of a liquid storage tank.

The chief aim of my invention is to provide a seal for a liquid agitating device in the form of a compact, self-contained unit which is readily attached to the tank; which is of rugged construction and free against easy derangement; and of which the internal parts can be removed and disassembled for repair or replacement of any that have failed because of wear, without attendant leakage of liquid from the tank in the interim.

Other objects and attendant advantages will appear from the following detailed description of the attached drawings, wherein.

As exemplified in FIGS. 1–6 of these illustrations, the agitating device of my invention is in the form of a self-contained powered unit comprehensively designated 20, adapted to be mounted at the side of tank T containing liquid L to be stirred or agitated. It will be observed that the device comprises a horizontally elongate multipartite housing 21 whereof the main section 22 provides a chamber 23 and has a reduced open sided inner end portion 24, said section being secured, with interposition of a circular cover plate 25, by means of annularly spaced bolts 26, to a flanged annulus 27 welded to the wall W of tank T as conventionally indicated at 28 in FIGS. 1 and 3. It is to be noted from FIG. 6 that the holes 29 in the flange 30 of the housing for passage of the shanks of alternate bolts of the series 26 are made oversize. Also for a purpose later on explained, the cover plate 25 is provided with annularly spaced tapped holes 31 which are normally stoppered by removable screw plugs 32. The other end of the housing section 22 is closed by a head 33 which is secured by bolts 34, said head having a diametrically reduced extension 35 which is closed, in turn, by a cover 36 secured by bolts 37.

Figure 3:
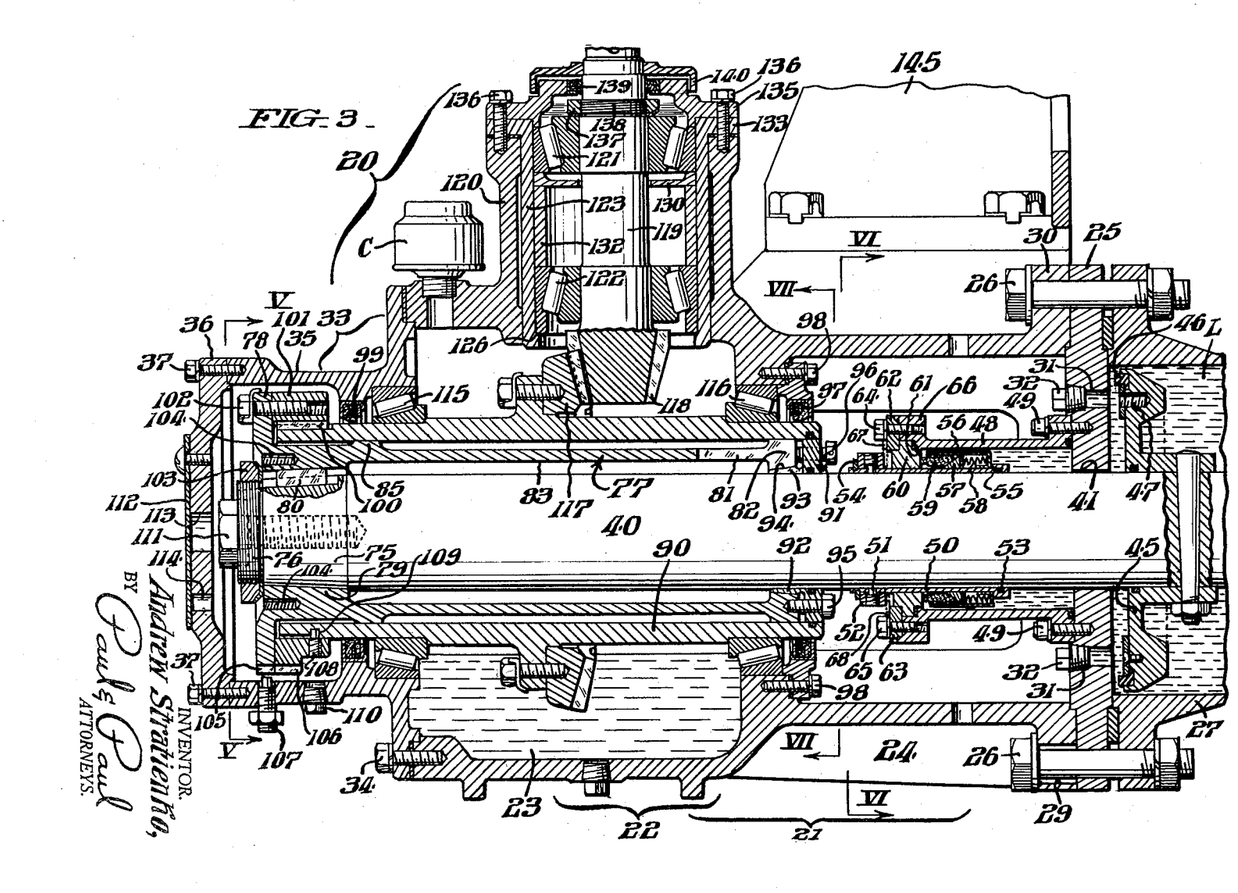
FIG. 3 is a fragmentary view in longitudinal section taken as indicated by arrows III—III in FIG. 2 and drawn to a larger scale.

Axially disposed within the housing 21 is a unitary shaft 40 which extends through a clearance aperture 41 (FIGS. 3 and 4) in the cover plate 25 and a preallocated opening 42 (FIG. 1) in the tank wall W to the exterior of the tank T. To the inner end of the shaft 40 is affixed propeller 43 having three or more blades. Pinned to the shaft 40 within the hollow of the flanged annulus 27 is an auxiliary sealing element in the form of a disk 45 which, on the face thereof confronting the plate 25, carries an annular sealing gasket 46. Normally the shaft 40 is longitudinally positioned as shown in FIG. 3, i.e., with the disk 45 spaced from the cover plate 25 and the sealing gasket 46 out of contact with said plate. As shown, the disk 45 is provided with annularly spaced tapped holes 47 to correspond with the tapped holes 31 in the cover plate 25.

Disposed within the portion 24 of the housing component 21 is a smaller cylindrical casing 48 through which the shaft 40 passes and which is affixed by means of cap screws 49 to the cover plate 25. Embracing the shaft 40 and extending partway into the casing 48 is the sleeve 50 of a package sleeve-mounted prime or main end face mechanical seal assembly, said sleeve being held in place on shaft 40 by set screws 51 threadably engaged in a collar 52 surrounding its protruding end. At its inner end, the sleeve has an internal circumferential groove which is occupied by an O ring 53, and at its outer end an external groove occupied by a split retaining ring 54 for the collar 52. Surrounding the enclosed portion of the sleeve 50 and backed against a peripheral shoulder 55 of said sleeve is the tubular shell 56 of the sealing means. A wedge ring 57 within the shell 56 is biased forwardly by springs 58 to maintain a sealing ring 59 in pressure contact with a collar 60 which closes the outer end of the shell 56.

As shown, the collar 60 has a perimetric ridge which seats, with interposition of a ring gasket, against the shoulder of a circumferential recess 61 internally of the outer end of the casing 48, said collar being held in assembly, in accordance with my invention, by a diametrically split retaining ring of which the two semicircular halves 62 and 63 bear laterally against the perimetric ridge of the collar 60 and are secured by cap screws 64 and 65 of which the shanks threadedly engage into the flange 66 of the casing 48. For a purpose also hereinafter explained, the half rings 62 and 63 are provided respectively with lug pieces 67 and 68 which are normally held in retracted position as in FIG. 6 by pivotal clamp screws 69 and 70. It is to be understood that the primary sealing means just described is of a well known construction and available on the market except for the facilities which I have devised for its retainment in the casing. Other generally similar end face mechanical seals may also be utilized in the same sort of complete mechanical seal assembly.

Figure 4:
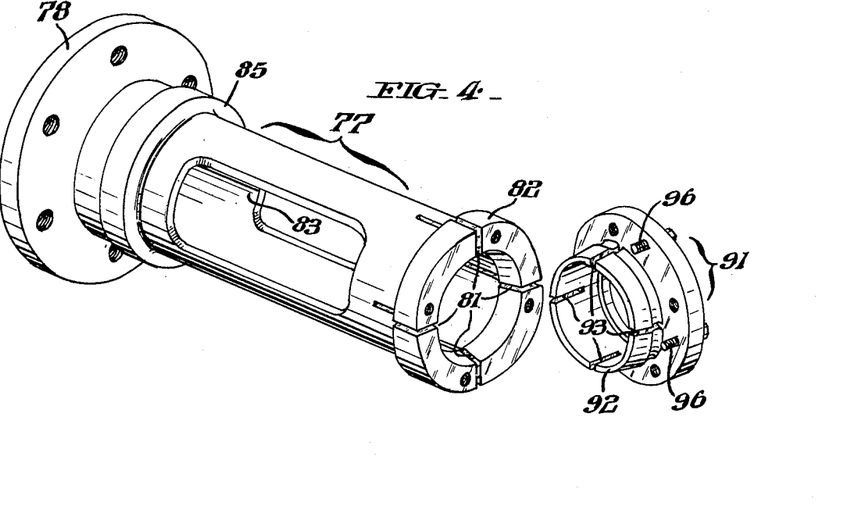
FIG. 4 is a view in perspective showing, in juxtaposition, two component parts of the device.
Figure 5:
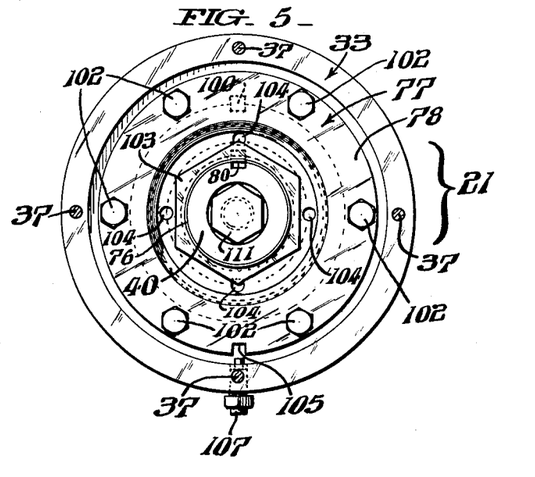
FIGS. 5, 6 and 7 are fragmentary views in cross section taken as indicated respectively by the arrows V—V, VI—VI and VII—VII in FIG. 3.
Figure 6:
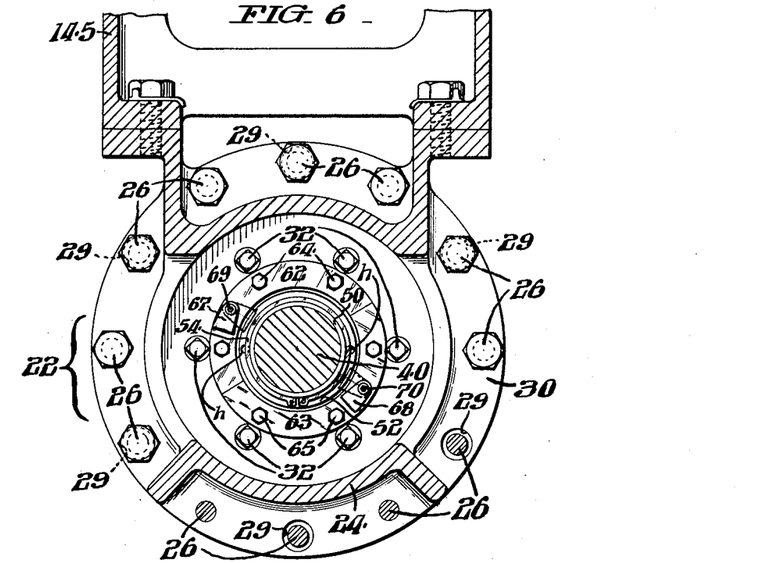
Figure 7:
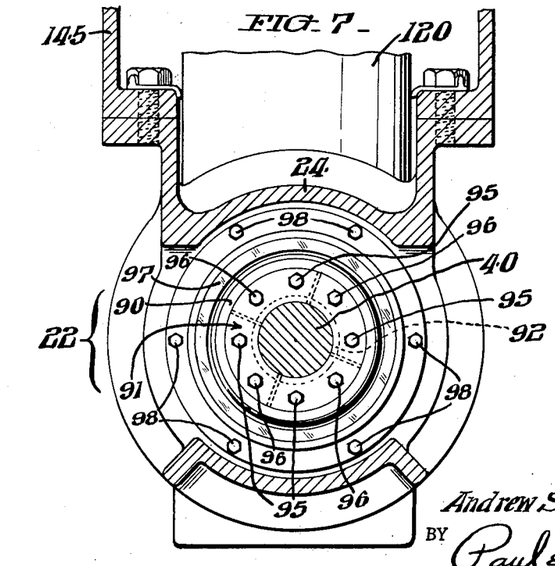

As further shown in FIG. 3 the outer end of the shaft 40 is tapered as at 75 and threaded as at 76 beyond the taper. Surrounding the shaft 40 within the portions 22 and 23 of the housing 21 is a sleeve 77 (separately illustrated in FIG. 4) whereof one end is flanged as at 78, said sleeve having an internal circumferential portion 79 with a tapered bore to fit the taper 75 of said shaft. For the sake of lightness, the sleeve 77 is made with openings centrally of its opposite sides as best shown in FIG. 4. The key indicated at 80 and engaged in corresponding slots respectively in the portion 79 of the sleeve 77 and in the tapered portion 75 of the shaft 40, serves as a drive connection between said sleeve and said shaft. The sleeve 77 is quadrantly split at its opposite end as at 81 and is outwardly and inwardly flanged as at 82. Between its ends, the sleeve 77 is hollowed out as at 83 and, at a relatively short distance inward of its flange 78, is formed with an external circumferential ridge 85 of which the diameter is equal to the outer diameter of the end portion 82. In turn, surrounding the sleeve 77 is a larger sleeve 90 which fits over the ridges 82 and 85 of said sleeve 77. Embracing the shaft 40 and fitting into the righthand end of the sleeve 90 is an adapter collar 91 having a tapered axial wedge extension 92 which is quadrantly split as at 93 in FIG. 4 to engage into the correspondingly tapered bore 94 in the split end of the sleeve 77. Cap screws 95, of which the shanks pass freely through collar 91 and threadedly engage into sleeve 77, serve to draw the adapter collar toward said sleeve, and, providing a wedging action which causes adapter collar to contract upon the shaft 40. By means of screws 96 having their shanks threaded in the collar 91, and bearing against end of the sleeve 77, said collar is made retractable. The righthand end of sleeve 90 protrudes into portion 24 of the housing and is surrounded by a sealing ring 97 made fast by cap screws 98. The left-hand end of sleeve 90 extends through a sealing ring 99 into the extended portion 35 of the head 33 of the housing and is connected, by a key 100, to a driving collar 101 affixed, by cap screws 102, to the back of the flange 78 of the sleeve 77 which, by the wedge collar 91 and key 80, is thus drive connected to the shaft 40. A draft nut 103, engaged upon the threaded end 76 of the shaft 40 and bearing against the corresponding end of the sleeve 77, is relied upon to keep said sleeve tightly engaged with the taper 75 of said shaft. For a purpose later explained, the sleeve 77 is provided in its lefthand end with tapped holes 104, and the collar 101 and the sleeve 77 are provided with registering peripheral notches 105 and 106 respectively. A normally retracted stud 107 threaded into the extended portion 35 of the head 33 is engageable into the notch of sleeve 77; and threaded into said collar is a set screw 108 which is normally engaged into a hole 109 in the sleeve 90, said screw being accessible upon removal of a plug 110 from the extended portion 35 of the head 33. Moreover, for the purposes of my invention I have provided a large screw bolt 111 of which the shank is normally engaged axially into the tapered end of the shaft 40, and a removable plate 112 which normally obstructs an axial hole 113 and a number of annularly arranged holes 114 in the cover 26. As further shown in FIG. 3, the sleeve 90 is rotatably supported by roller bearings 115 and 116 set into the opposite end walls of the chamber 23 of the housing 22, and to it is secured a bevel gear 117 which is in mesh with a bevel pinion 118 at the bottom end of a vertical shaft 119. As shown, the shaft 119 passes downwardly through a vertical neck extension 120 of the housing and is rotatively supported in spaced roller bearings 121 and 122 set into a flanged cylindrical cartridge 123 that fits snugly into housing extension 120. The outer raceway of the bearing 122 rests upon an internal annular shoulder 126 at the bottom of the cartridge 123. The outer raceway of the upper roller bearing 121 rests on an axially apertured disk 130 surrounding the shaft 119, and between said disk and the outer raceway of the lower roller bearing 122 is positioned a cylindrical spacing element 132. The flange 133 of the cartridge 123 overreaches the top of the housing extension 120 and, superimposed upon it, is a cap ring 135 which, at the bottom, has a pendant annular flange engaged downwardly upon the outer race of the upper roller bearing 121. Securing bolts 136 having their threaded shanks extending down through clearance holes respectively in the cap ring 135 and in the flange 133 of the cartridge 123 threadedly engage into the top of the housing extension 120. The inner race of the upper roller bearing 121 is held in place by a nut 137 on the threaded portion 138 of the shaft 119. Set into the opening of the cap ring 135, at the top, is a sealing ring 139 which surrounds the shaft 119 above the threaded portion 138, said ring being protected against entry of dirt by an apertured umbrella 140 which rests upon an annular shoulder on the shaft 119 above said sealing ring.

Figure 1:
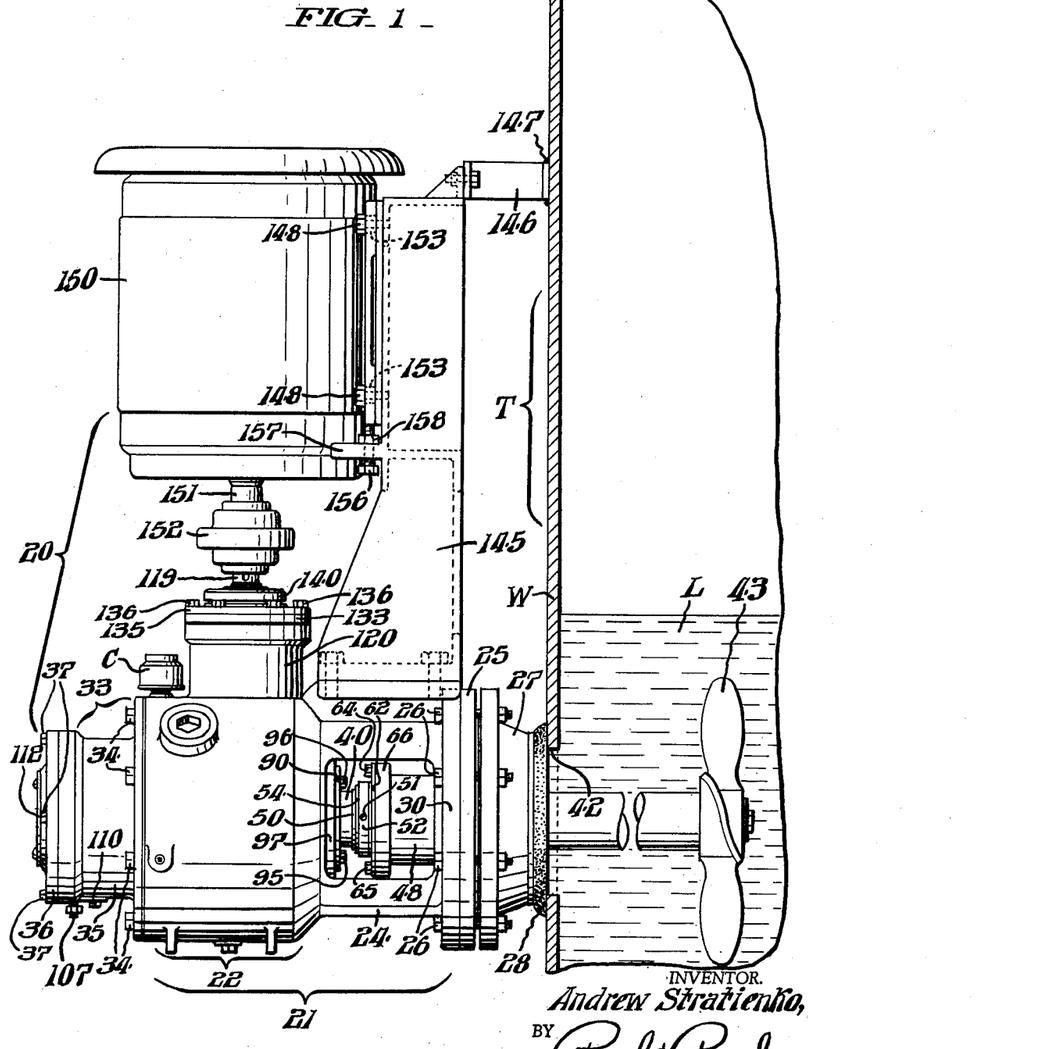
FIG. 1 is a view showing in side elevation an agitating device conveniently embodying my invention in one form as applied to the wall of a liquid storage tank.
Figure 2:
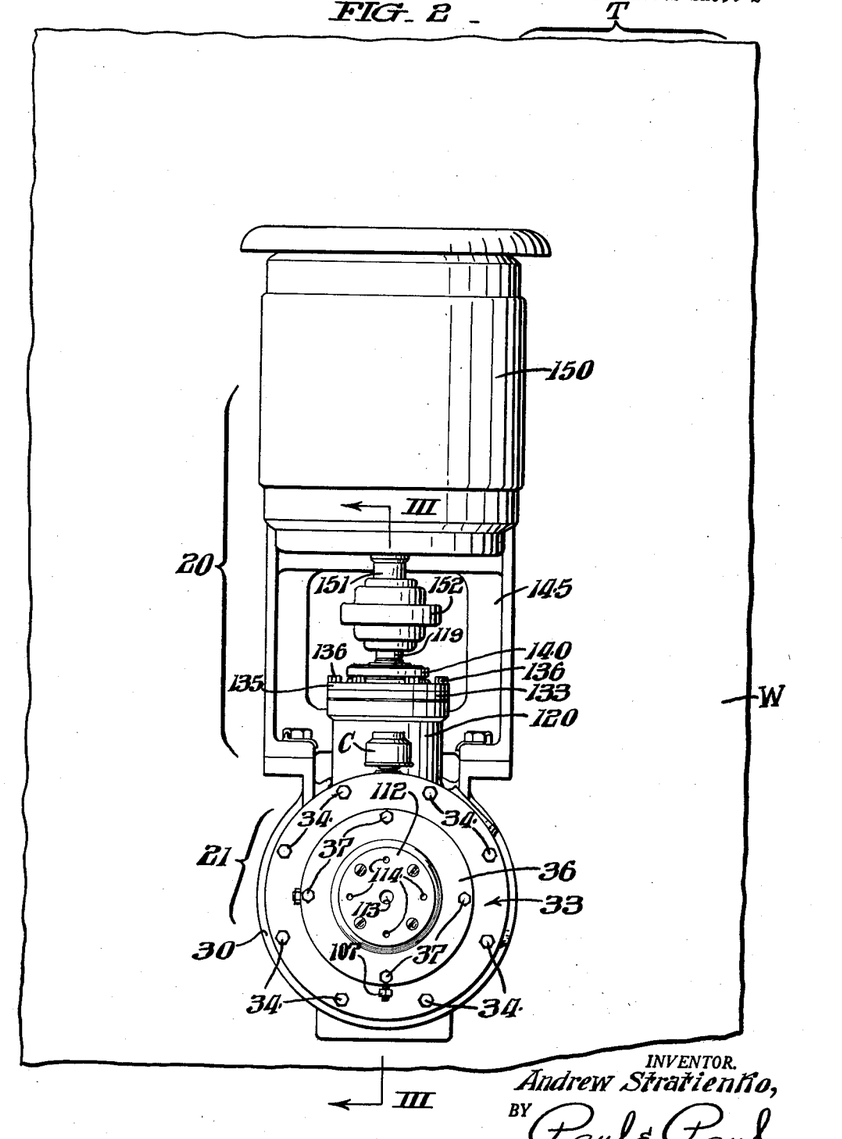
FIG. 2 shows the device in end elevation as seen when viewed from the left of FIG. 1.

Bolted to the top of the housing portion 24 is an upright frame member 145 which, at the upper end, is bolted to a bracket arm 146 welded as at 147 to the side of the tank T. Bolted in turn to the outer side of the frame 145, by means of cap screws 148, is an electric motor 150 whereof the shaft 151 is connected by means of a coupling element 152, to the protruding upper end of the shaft 119. It will be observed that the apertures 153 in the base of the motor 150, through which the shanks of the bolts 148 pass are vertically elongate, so that the motor can be vertically adjusted by means of adjusting screws 156 the shanks of which threadedly engage into lugs 157 (whereof one only is shown in FIG. 1) projecting outwardly from the frame 145, the adjustment being fixable by jam nuts 158 respectively associated with said bolts.

In practice, the chamber 23 of the housing 22 is partially filled with lubricant into which the gear 117 and bearings 115, 116 dip and carry oil to the meshing pinion 118 and bearing 120, leakage of the lubricant beyond the bearings 115 and 116 being prevented by the sealing rings 97 and 99. The lubricant is introduced into chamber 23 by way of a breather cup C screwed into the top of the housing and the level thereof determined upon removal of a plug (FIG. 1 at the side of the portion 23 of the housing). The upper extension 120 of the housing is also kept filled with lubricant which is prevented from leaking into the chamber 23 by the disc 130. It will be seen that during the operation of the device the power from the motor 150 is transmited through the gears 118 and 117 to the sleeve 90, from thence to sleeve 77, and finally to the shaft 40, with consequent agitation of the liquid in the tank T by the impeller 43.

Figure 8:
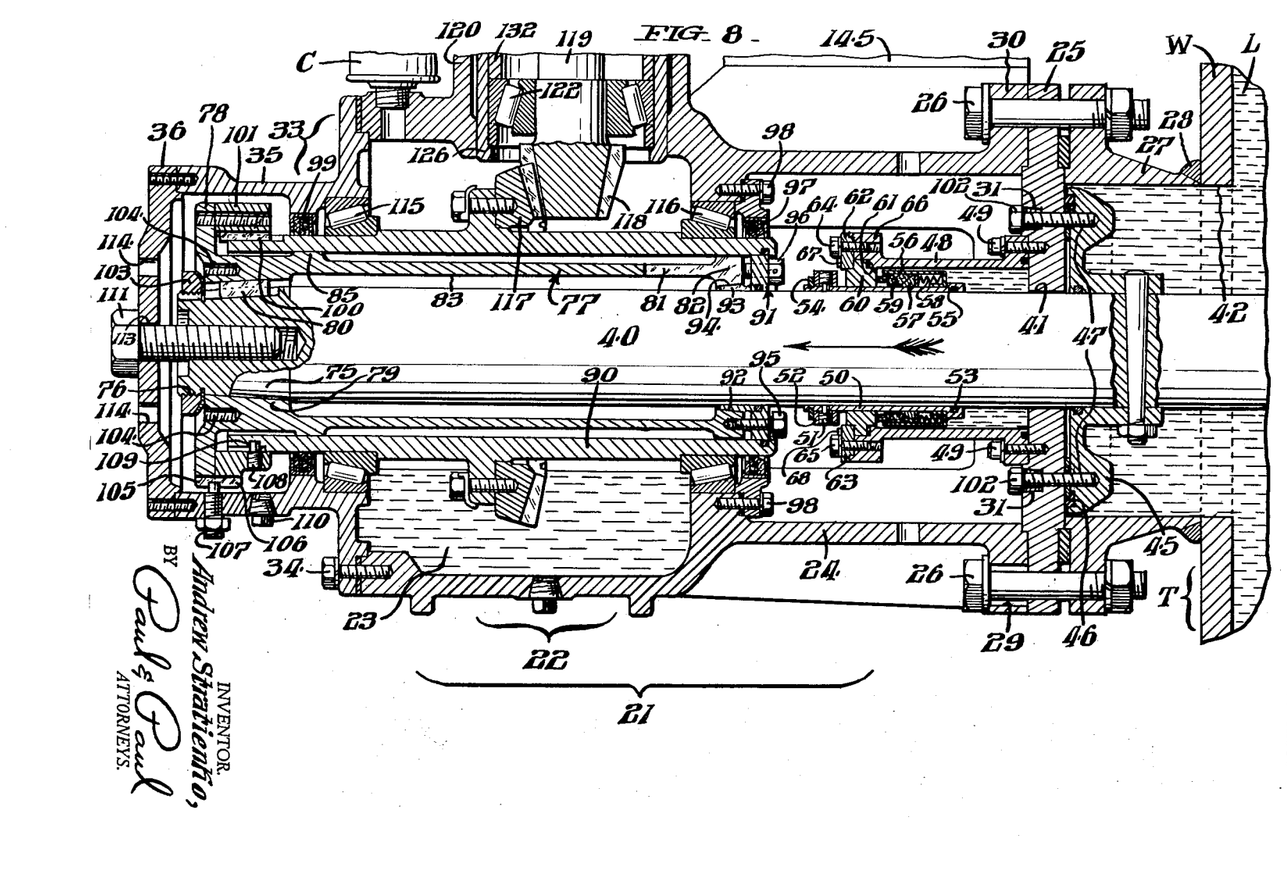
FIGS. 8, 9, 10 and 11 are views corresponding to FIG. 3 showing successive steps resorted to in partially disassembling the device for repair or replacement of certain parts which have become worn.
Figure 9:
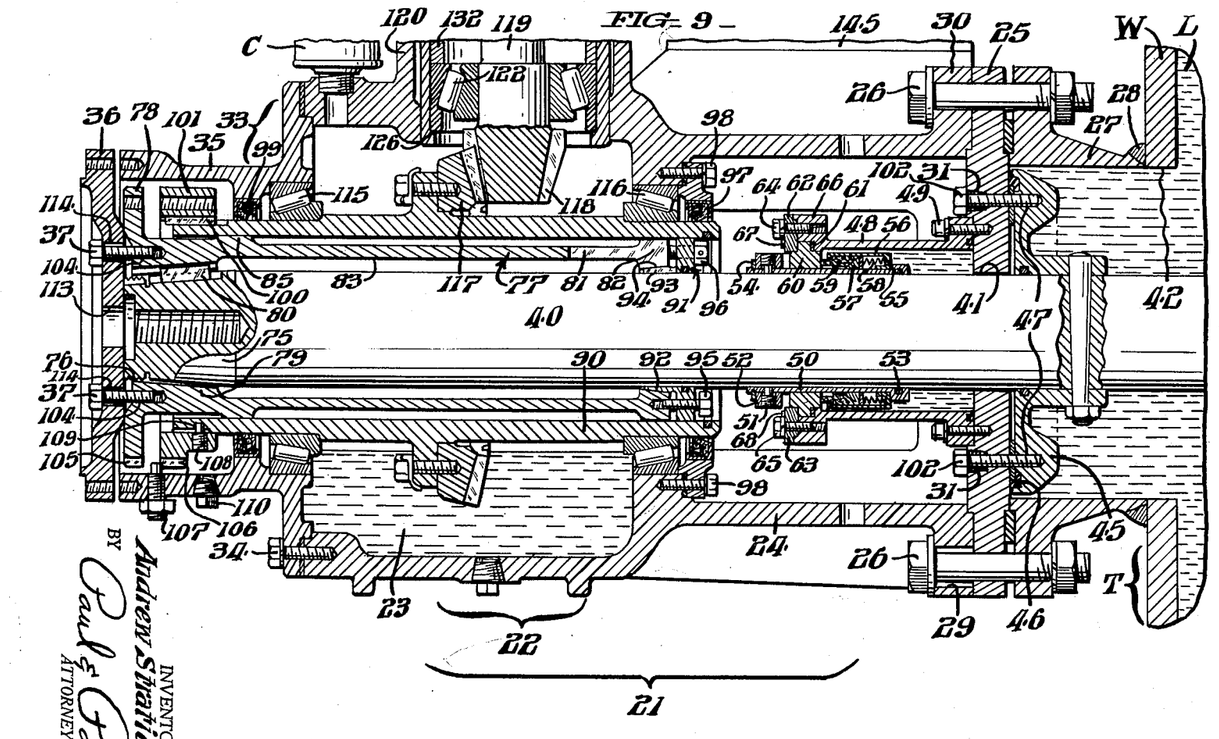
Figure 10:
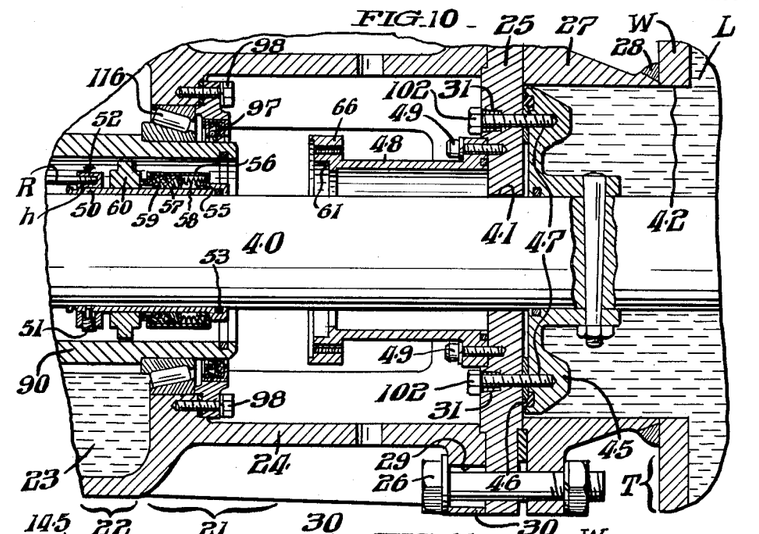

In the event of fluid leakage from the tank T due to wear or failure of the primary sealing means 56 after operation of the device over long protracted periods, said sealing means is removable for repair of worn parts thereof or for complete replacement by resorting to the following procedure: the cap 36 is removed from the outer end extension 35 of the housing whereupon shaft 40 is turned, by means of a suitable socket wrench applied to the nut 103, to bring the peripheral notch 106 in the collar 101 into registry with the stud 107 which is thereupon entered into said notch as in FIG. 8 to lock the shaft against rotation, the tapped holes 47 in the disc 45 being thereby brought into axial registry with the holes 31 in the closure plate 25. The bolts 102 are next removed to free the flange 78 of the sleeve 77 from the collar 101 on the sleeve 90. The bolt 111 is then removed from the shaft 40 and the disk 112 removed from the cover 36 which latter is thereupon re-applied to the housing as in FIG. 8, and the shank of said bolt passed through the hole 113 in said cover and re-entered into said shaft. The bolts 95, accessible through the side openings in the housing extension 24, are first backed off as in FIG. 8, and the bolts 96 then tightened to draw rightward upon the adapter 91 so as to break the wedge engagement of said adapter with the sleeve 77. Also the sleeve 50 of the primary seal is released from the shaft 40 by loosening set screws 51 in collar 52. As the bolt 111 is tightened, the shaft 40 is drawn outward (leftward) until stopped by engagement of the gasket 46 of the auxiliary sealing disk 45 with the confronting face of the cover plate 25 as in FIG. 8. The plugs 32 (FIG. 3) are then removed from the holes 31 in the closure plate 25 and the shanks of bolts 102 passed through said holes as in FIG. 8, and engaged into the tapped holes 47 in the disk 45. As the bolts 102 are tightened, the disk 45 is moved further toward the plate 25 with attendant additional compression of the sealing gasket 46 against the confronting face of said plate. With the foregoing accomplished, the bolt 111 and the nut 103 are removed from the shaft 40 and the cover 36 is reversely re-applied as in FIG. 9, the shanks of bolts 37 then passed through the holes 114 in said cover and engaged into the tapped holes 104 in the contiguous end of the sleeve 77. The bolts 37, when tightened, break the taper fit between the shaft 75 and the sleeve 77 at 79. Thereupon, by means of suitable tongs or the like, the cover 36 is grasped and the sleeve 77, together with the adapter collar 91, is slid outward through the sleeve 90 of the gear drive from off the shaft 40. The bolts 64 and 65, accessible through the open sides of the casing extension 24, are next removed, permitting the half rings 62 and 63 to be withdrawn. At the same time, the split clamp ring 54 is removed from the shell of the primary sealing means 56. Then, by screw drawn rods such as the one indicated at R in FIG. 10 and the tapped holes h provided for their reception in the ring 52 of the primary sealing means, said sealing means can be withdrawn outwardly off the shaft 40 through the sleeve 90 of the gear drive, as will be readily understood. After repair of the primary sealing unit, it is slipped back over the shaft 40 until stopped by seating of the collar 60 in the recessed end of the casing 48, whereupon the half ring sections 62 and 63 are re-applied and secured by the bolts 64 and 65. The rods R are then re-entered into the holes in the collar 52 and used to draw the sleeve 50 of the auxiliary sealing means 56 outward (leftward) slightly to compress the springs 58. With the sleeve 50 so held temporarily, the lugs 67 and 68 on the half ring sections 62 and 63 are swung inwardly as shown in the dotted lines in FIGS. 3 and 6 to serve as stops to intercept the collar 52 as the sleeve 50 of the primary sealing means is drawn rearwardly by reaction of the springs 58 upon release of the pull rods R which are thereafter withdrawn. With the primary sealing means 56 thus reinstalled, the split ring 54 is clamped about the protruding end of the sleeve 50 of said sealing means. The sleeve 77 is finally replaced by reversing the procedure followed in removing it, with the end result that the apparatus is restored to its original operating condition as in FIG. 3. Of course, if desired or necessary, an entirely new primary sealing unit may be substituted for the worn one.

Figure 11:
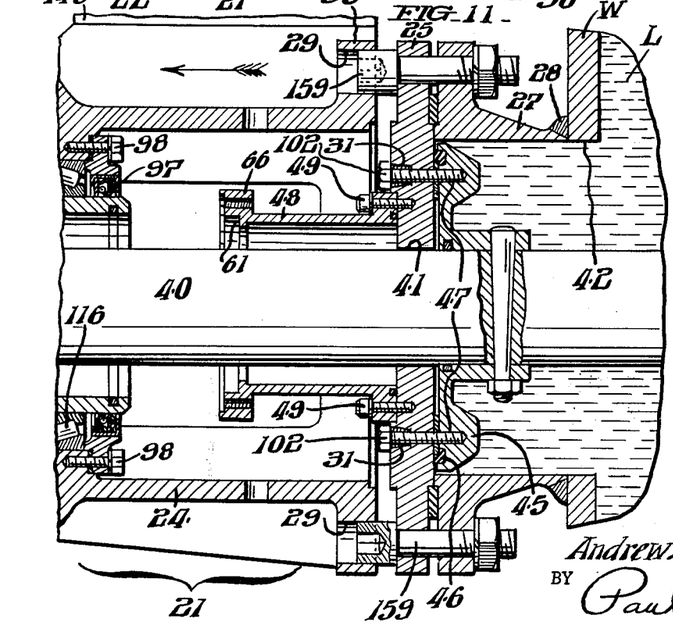

In case of a breakdown, the device can be easily and quickly removed for repairs or replaced by an entirely new one. The procedure in such case is as follows: after dismantling the device as far as described above in connection with FIG. 10, the alternate bolts 26 (FIG. 3) i.e. those occupying the enlarged holes 29 in the flange of the housing section 22, are removed and for them are substituted bolts 159, as in FIG. 11, having cylindrical heads of a size corresponding to said holes, said substitute bolts being relied upon temporarily to hold the closure plate 25 to the annulus 27. The remaining or intermediate bolts 26 are next removed thereby freeing the housing 21. With the housing 21 temporarily supported by the bolts 159, the bolts (FIG. 1) by which the frame 145 is secured to the bracket 146, are finally removed leaving the assemblage free to be taken away. Application of the device after repairs have been made, or of an entirely new one, is accomplished by reversing the immediately foregoing procedure. If replacement of the sleeve 90 or the bevel gear 117 should be necessary, they can be withdrawn (after removal of the sleeve 77 as previously explained) by unbolting and taking away the end section 33 of the housing 21. On the other hand, if replacement of the shaft 119 and the bevel pinion 118 should be necessary, it can be removed by resorting to the following steps: disconnecting the coupling 152 (FIG. 1) and unbolting the motor 150; then removing the bolts 136 to release the cover 135 from the upward extension 120 of the housing section 122; then lifting said cover together with the cap 135; then withdrawing the cartridge 123 bodily from the housing; and finally unscrewing the nut 137 and pulling the shaft 119 out through the bearings 122 and 121 Installation of a new pinion shaft is accomplished, of course, by reversing this procedure as will be readily understood.

Figures 12, 13:
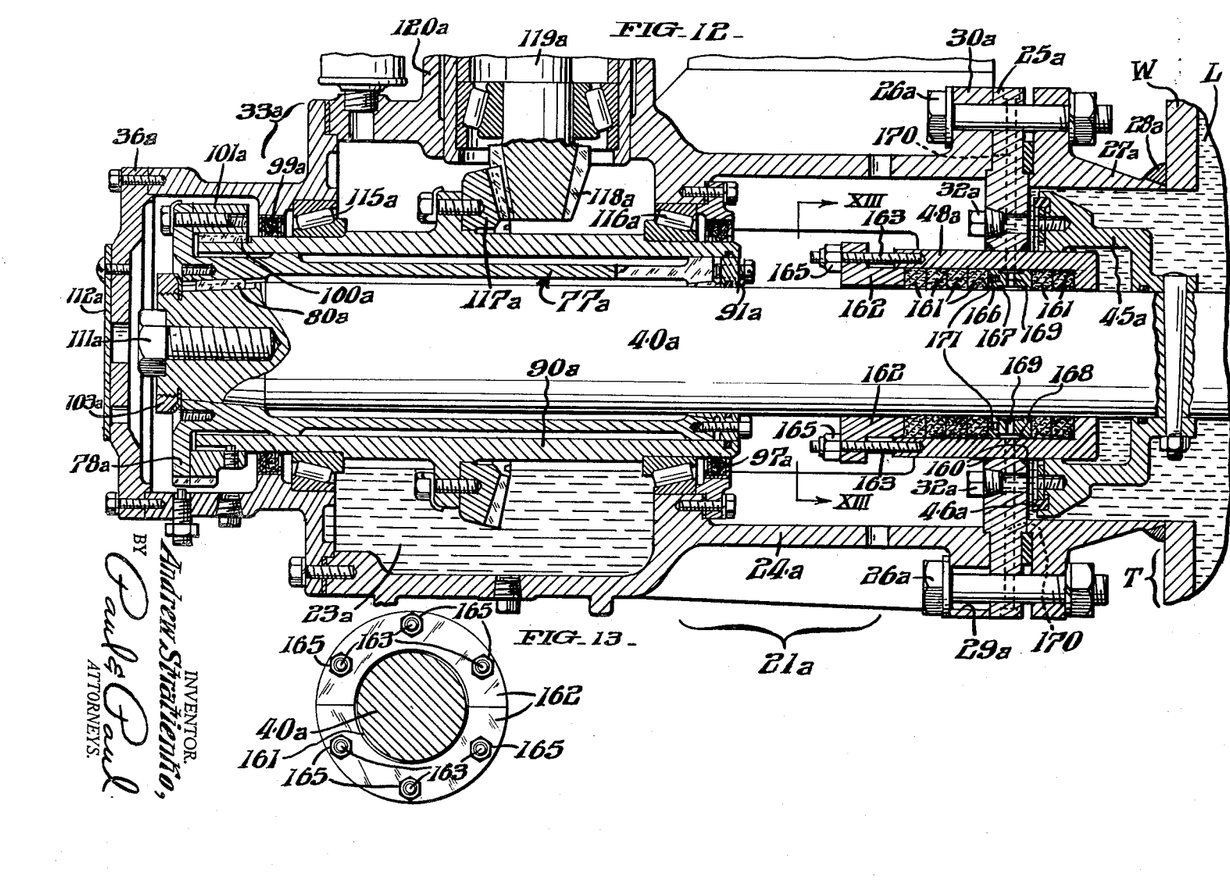
FIG. 12 is a sectional view similar to FIG. 3, showing an alternative embodiment of the invention.
FIG. 13 is a detail sectional view taken as indicated by the angled arrows XIII—XIII in FIG. 12.

Except for differences particularly pointed out presently, the modified construction illustrated in FIGS. 12 and 13 is identical with that of the first described embodiment and, accordingly, the corresponding parts have been identified by the same reference characters previously employed with addition, however, in each instance of the letter "a" for convenience of more ready distinction. In this modification, the casing 48a for the primary sealing means is plain cylindrical, the same extending through the plate 25a into the annulus 27a and being integrated to said plate by welding as at 160. The disk 45a is pinned to the shaft 40a as before but is here rearwardly offset and hollowed out to clear the inner end of the casing 48a. As shown, the housing 48a is stuffed with ordinary split packing rings 161, which are retained in said housing and maintained in compression by a gland 162 formed by two half ring sections whereof the flanges are pierced to engage freely over threaded studs 163 anchored in the outer end of said casing 48a, said studs being provided with draw-up nuts 165. Disposed within the casing 48a amongst the packing rings 161 and surrounding the shaft 40a is a metallic lubricant distributing ring 166 having internal and external circumferential grooves 167 and 168 communicating by way of radial passages 169. As shown, the cover plate 25a is provided with radial ducts 170 which are prolonged through the wall of the housing 48a and through which lubricant can be introduced under pressure into the province of the ring 166. When, due to wear or age, renewal of the packing becomes necessary, the shaft 40a is drawn outwardly by following the same procedure as above described in connection with the first embodiment to bring the sealing ring of the disk into fluid tight contact with the plate 25a. With this accomplished, the nuts 165 are backed off from the studs 163 and the gland half sections withdrawn after which the packing can be readily removed up to the oil ring 166 by means of suitable hook implements. Pull rods (not shown) are next screwed into tapped holes 171 provided in the oil ring 166 which is thereupon drawn out of the housing. The remaining packing rings are finally removed, leaving the hollow of the supplemental housing empty in readiness to be repacked. After replacement of the packing, the shaft 40a is shifted rightward to its original position in the assembly, likewise in the same manner as set forth in connection with the first described embodiment.

Figure 14:
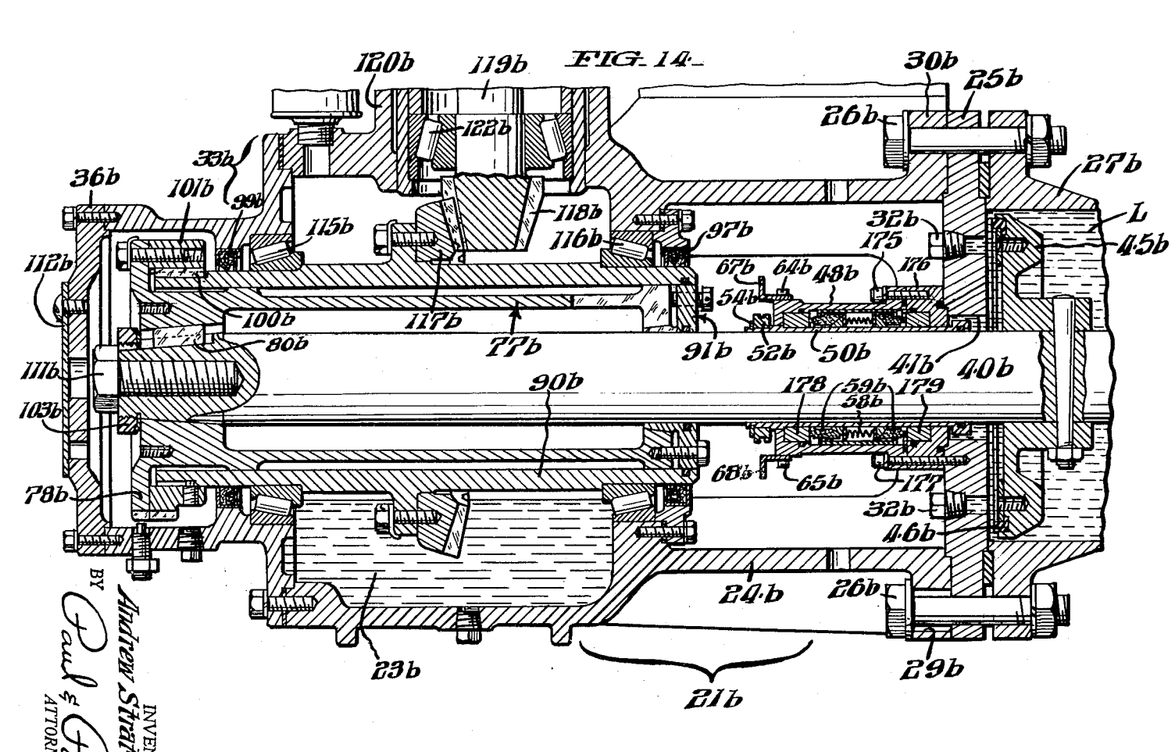
FIG. 14 is a sectional view similar to FIG. 3, showing another alternative embodiment.

In the embodiment illustrated in FIG. 14 the casing 48b for the primary sealing means is secured by means of screws 175 to an annular block 176. Other screws 177 extend through said block 176 and engage into the cover plate 25b. Recessed into the outer end of the casing 48b and in the block 176, and surrounding the sleeve 50b of the primary sealing means are collars 178 and 179. Compression springs 58d serve to urge the wedge rings 57b in opposite directions to maintain the packing rings 59b in pressure contact with the collars 178 and 179. It is to be particularly noted that in this modification the opening 41b in the closure plate 25d is made larger than in the previously described embodiments for protrusion thereinto of the sleeve 50b of the primary sealing means. It is to be further observed that the outside diameter of the block on 176 is slightly smaller than the internal diameter of the sleeve 90b so that it can be slid off the shaft together with the casing 48b containing the primary sealing means after the shaft has been shifted to bring the disk 45b into sealing contact with the closure plate 25b and the sleeve 77b has been temporarily removed in the same way as described in connection with the previous embodiments. The lugs 67b and 68b attached by screws 64b and 65b to the outer end of the supplemental housing 48b, are intended to serve as stops for the collar 52b during installation of the primary sealing means. Other than specifically set forth above, the sealing means here is substantially of the same construction as that of the first described embodiment.

While in accordance with the provisions of the statutes, I have illustrated and described the best forms of embodiment of my invention now known to me, it will be apparent to those skilled in the art that changes may be made in the forms of the apparatus described without departing from the spirit and scope of the invention as set forth in the appended claims, and that in some cases certain features of my invention may be used to advantage without a corresponding use of other features.

Having thus described my invention, I claim:

1. In a shaft seal construction for a unitary rotatable shaft one end portion of which passes through an opening into a fluid container and the other portion of which projects therefrom; primary sealing means encircling a projecting portion of said shaft and adapted, when in sealing position, to prevent leakage of fluid from said container along said shaft; auxiliary sealing means encircling said shaft and normally out of sealing position but adapted to be moved into sealing position; a first sleeve adapted to be connected to drive means external of said container, said first sleeve surrounding a projecting portion of said shaft beyond a said primary sealing means and having an internal diameter larger than the outside diameter of said primary sealing means; removably-mounted connecting means connecting said first sleeve to said shaft, said connecting means including a second sleeve positioned between said first sleeve and said shaft, said second sleeve being removably connected to said first sleeve and to said shaft, and so arranged that when said connecting means is removed said primary sealing means may be slid axially along said projecting portion of said shaft and removed from said shaft.

2. In a shaft seal construction for a unitary rotatable shaft, one end portion of which passes through an opening in a fluid container and the other portion of which projects therefrom; shaft-encircling primary sealing means outward of said container and adapted, when in sealing position, to prevent leakage of fluid from said container along said shaft; auxiliary sealing means encircling said shaft within said container and normally out of sealing position but adapted to be moved into sealing position by moving said shaft in its axial direction; a first sleeve surrounding said projecting shaft outward of said primary sealing means and adapted to be connected to drive means external of said container, said sleeve having an inside diameter larger than the diameter of said shaft, forming an annular space therebetween; removably-mounted connecting means normally in said annular space for connecting said first sleeve to said shaft and so arranged that, when said connecting means is removed, said shaft-encircling primary sealing means may be removed from said shaft by moving it slidingly along said projecting shaft through the annular space normally occupied by said connecting means.

3. Apparatus as claimed in claim 2 characterized in that said connecting means includes a second sleeve positioned in the annular space between said first sleeve and said shaft, said second sleeve being removably connected to said first sleeve and removably keyed to said shaft.

4. In a shaft seal construction for a unitary rotatable shaft one end portion of which passes through an opening in a fluid container and the other portion of which projects therefrom; sealing means encircling a projecting portion of said shaft and adapted when in sealing position to prevent leakage of fluid from said container along said shaft; a drive sleeve encircling said projecting portion of said shaft outward of said sealing means and adapted to be connected to drive means, said drive sleeve having an inside diameter larger than the outside diameter of said sealing means forming between said sleeve and said shaft an annular space through which said sealing means may be slidably moved; removably-mounted connecting means for connecting said drive sleeve to said shaft and so arranged that, when said connecting means is removed, said shaft-encircling sealing means may be slid through said annular space and removed from the end of said unitary shaft.

References Cited in the file of this patent

UNITED STATES PATENTS

| | | |
|---|---|---|
| 2,137,328 | Bissell | Nov. 22, 1938 |
| 2,268,218 | Lum | Dec. 30, 1941 |
| 2,612,391 | Boutros | Sept. 30, 1952 |
| 2,627,171 | Brumagim | Feb. 3, 1953 |
| 2,638,364 | Rechtin | May 12, 1953 |
| 2,746,779 | Lobanoff | May 22, 1956 |
| 2,911,240 | Boutros et al. | Nov. 3, 1959 |
| 2,945,711 | Dykman | July 19, 1960 |